US009156228B2

(12) United States Patent
Buehring et al.

(10) Patent No.: US 9,156,228 B2
(45) Date of Patent: Oct. 13, 2015

(54) METHOD FOR PRODUCING A MULTI-LAYER PLASTIC FILM

(71) Applicant: Benecke-Kaliko AG, Hannover (DE)

(72) Inventors: Juergen Buehring, Wedemark (DE); Thomas Malner, Goeppingen (DE); Joseph Mani, Eislingen (DE); Volker Huelsewede, Schlat (DE)

(73) Assignee: Benecke Kaliko AG, Hannover (DE)

( * ) Notice: Subject to any disclaimer, the term of this patent is extended or adjusted under 35 U.S.C. 154(b) by 77 days.

(21) Appl. No.: 13/920,751

(22) Filed: Jun. 18, 2013

(65) Prior Publication Data

US 2013/0280517 A1 Oct. 24, 2013

Related U.S. Application Data

(63) Continuation of application No. PCT/EP2011/073075, filed on Dec. 16, 2011.

(30) Foreign Application Priority Data

Jan. 28, 2011 (DE) .......................... 10 2011 000 399

(51) Int. Cl.
*B32B 5/20* (2006.01)
*B32B 27/06* (2006.01)
*B32B 27/32* (2006.01)
*B29C 65/00* (2006.01)

(52) U.S. Cl.
CPC ................ *B32B 5/20* (2013.01); *B29C 65/002* (2013.01); *B32B 27/065* (2013.01); *B32B 27/32* (2013.01); *B32B 2266/025* (2013.01); *Y10T 428/249953* (2015.04)

(58) Field of Classification Search
CPC ......... B32B 5/20; C08J 9/122; C08J 2203/06; C08J 2323/04; C08J 2323/10; C08L 23/04; C08L 23/10
See application file for complete search history.

(56) References Cited

U.S. PATENT DOCUMENTS

| 4,473,665 | A | 9/1984 | Martini-Vvedensky et al. |
| 4,832,770 | A | 5/1989 | Nojiri et al. |
| 4,892,691 | A | 1/1990 | Kolossow |
| 6,140,425 | A * | 10/2000 | DeNicola et al. ............. 525/293 |
| 6,251,319 | B1 | 6/2001 | Tusim et al. |
| 6,663,738 | B2 | 12/2003 | Ohlinger et al. |
| 7,759,404 | B2 | 7/2010 | Burgun et al. |
| 2005/0176892 | A1* | 8/2005 | Weaver et al. ................. 525/194 |
| 2007/0184259 | A1* | 8/2007 | Brunner et al. ............ 428/318.4 |
| 2009/0022934 | A1 | 1/2009 | Park |
| 2010/0152361 | A1* | 6/2010 | Weaver et al. ................. 524/528 |
| 2010/0215934 | A1 | 8/2010 | Fabian Mariezkurrena et al. |

FOREIGN PATENT DOCUMENTS

| DE | 10 2005 050 524 A1 | 4/2007 |
| EP | 0 413 912 A1 | 2/1991 |
| JP | 2001-96602 A | 4/2001 |
| JP | 2005-119274 A | 5/2005 |

OTHER PUBLICATIONS

International Search Report dated May 11, 2012 of international application PCT/EP2011/073075 on which this application is based.

* cited by examiner

*Primary Examiner* — Hai Vo
(74) *Attorney, Agent, or Firm* — Walter Ottesen P.A.

(57) ABSTRACT

A method for producing a multi-layer plastic film comprising at least one compact cover layer and at least one layer which is arranged under the cover layer and made of extruded foamed plastic (foam layer), wherein the compact cover layer is connected to the foam layer thermally or by adhesion after extrusion and cooling of the foam layer to below the melting temperature. The layer made of foamed plastic is generated by blowing a propellent which is under positive pressure into a plastic melt during the extrusion process and by subsequently relaxing the propellent which is under positive pressure, wherein the foamed plastic is at first not cross-linked and is cross-linked together with the compact cover layer, in particular by high-energy radiation, only after the foam layer and the compact cover layer have been connected.

4 Claims, No Drawings

METHOD FOR PRODUCING A MULTI-LAYER PLASTIC FILM

CROSS REFERENCE TO RELATED APPLICATIONS

This application is a continuation application of international patent application PCT/EP2011/073075, filed Dec. 16, 2011, designating the United States and claiming priority from German application 10 2011 000 399.1, filed Jan. 28, 2011, and the entire content of both applications is incorporated herein by reference.

FIELD OF THE INVENTION

The invention relates to a method for producing a multi-layer plastic film having at least one compact cover layer and at least one layer which is arranged under the cover layer and made of extruded foamed plastic (foam layer), in which, after the extrusion and cooling of the foam layer below melt temperature, the compact cover layer is joined to the foam layer thermally or by adhesion. In addition, the invention relates to a plastic composition for the foam layer for carrying out the method and to a multi-layer plastic film produced by the method, and also to the use thereof.

BACKGROUND OF THE INVENTION

In the field of decorative polyolefin-based sheet materials, currently substantially two structures are used. For applications and building components in which the sheet material is subjected to high stretching (for example, >200%) in downstream thermal forming processes, compact film structures which can be made up of several layers are preferably used. These materials generally have a density of >800 kg/m$^3$ at a thickness of 0.5-3.0 mm, as a result of which the building components have a correspondingly high weight and, associated therewith, a high raw material requirement, see also U.S. Pat. No. 6,663,738.

For applications and building components in which the sheet material is subjected to low stretching (for example, <200%) in downstream thermal forming processes, sheet materials having at least one foamed layer, called foam layers, can be used. The compact cover layer can be reduced and constructed in a thickness of 0.2-0.8 mm for a density of >800 kg/m$^3$. The foamed layer is generally constructed having a density of 20-200 kg/m$^3$ and a thickness of 0.5-4.0 mm. The foamed layer reacts elastically to pressure stress, as a result of which pleasant haptic properties in response to pressure of the building components are achieved. Owing to the low density of the foamed layer, the weight of the building components falls, as does the raw material requirement necessary for the production.

Generally, a plastic foamed material based on a polyolefin composition is produced as follows: 5-100% by weight of one or more polyethylene-based plastics (these are understood to include polymers, the weight fraction of ethylene of which is >50% by weight) and also optionally 0-95% by weight of one or more polypropylene-based plastics (these are understood as including polymers, the weight fraction of polypropylene of which is >50% by weight) are mixed with a crosslinking agent and a chemical propellant (foaming agent) and also other process additives such as, for example, lubricants, stabilizers and pigments. A film is produced therefrom, for example, by extrusion. This film is exposed in the downstream process to a source of ionizing radiation, in such a manner that the melt strength is increased by molecular weight build up (crosslinking) in the plastic. In a subsequent heating process, using the propellant, a flat plastic foam material is obtained having a density of 20-200 kg/m$^3$ and a thickness of 0.5-4.0 mm. The foaming process can be carried out vertically in a foam oven or horizontally, for example, in a salt bath. The above described chemically driven foam process leads to fine-celled foams having a very uniform foam cell distribution. Such foams are described, for example, in DE 102005050524 A1.

The resultant plastic foam material can then be joined thermally or by adhesion to surface materials such as, for example, sheet materials based on polyolefins, PVC or polyurethanes, in such a manner that a multi-layer flat material having at least one foamed layer is formed. The surface of the multi-layer flat material can be constructed by an embossing process having a three-dimensional structure, called grain.

The resultant flat material can then be brought into a desired form by processes such as thermoforming, in-mold graining or low-pressure molding. These forms or bodies are used in aircraft, railway vehicles, ships and in motor vehicles, in particular as motor vehicle interior linings or lining components.

U.S. Pat. No. 4,473,665 describes a method in which a plastic foam material based on a polyolefin composition is produced, in that the polymer mixture is loaded above the glass transition temperature with an inert gas at superatmospheric pressure and this gas-loaded melt is then expanded and cooled below the glass transition temperature. According to this method principle, a polyolefin-composition-based plastic foam material having a density of 20 kg/m$^3$-800 kg/m$^3$ may be generated via extrusion or an injection molding process. Sheet materials generated by this principle in the density range <100 kg/m$^3$ generally exhibit a coarse-cell foam structure having a relatively broad cell size distribution.

The foamed polyolefin-based sheet materials generated in this manner are used, inter alia, in the building sector (for example, as footfall sound insulation in laminate floors, heat insulation of pipes, edge trims when laying floors) and in the packaging sector. Owing to the predominantly thermoplastic character of the sheet materials made by this method principle, they are unsuitable to date for the above described thermal forming process for producing three-dimensionally shaped bodies for use, for example, as motor vehicle interior linings or motor vehicle interior lining components.

Further methods for producing multi-layer plastic films are known, for example, from the publications: United States patent application publication 2010/0215934; U.S. Pat. No. 4,832,770; U.S. Pat. No. 4,892,691; EP 413912 B1; United States patent application publication 2009/0022934; JP 2001-096602 A; JP 2005-119274 A; and, U.S. Pat. No. 6,251,319.

SUMMARY OF THE INVENTION

The object of the invention was to produce a deep-drawable foam film as a multi-layer plastic film having at least one foamed layer which, at low density values has sufficient stability at degrees of stretching of >300%, preferably >400%, particularly preferably >500%, on deep drawing and which can also be thermally formed and nevertheless have sufficient pressure and heat stability.

In the method, the layer made of foamed plastic is generated by loading the plastic melt with a propellant which is at superatmospheric pressure, in particular an inert gas, by blowing during the extrusion process above the melt temperature, and this gas-loaded melt then being expanded on exit from the extrusion installation and cooled below the melt temperature. The layer made of foamed plastic is therefore generated by blowing propellant at superatmospheric pressure into a plastic melt during the extrusion process and by subsequent expansion of the propellant which is at superatmospheric pressure, wherein the foamed plastic is not crosslinked and is subsequently crosslinked together with the compact cover layer, in particular by high-energy radiation, only after the foam layer and the compact cover layer have been joined.

In the context of marked foam formation, advantageously, the propellant used is an inert gas, or a propellant is used which contains an inert gas.

The resultant plastic foam material is then joined thermally or by adhesion to a compact cover layer in the form of a flat material which has, for example, sheet material based on polyolefins, PVC or polyurethane, in such a manner that a multi-layer plastic film having at least one foamed layer is formed.

The surface of the multi-layer plastic film can be formed with a three-dimensional structure, called grain, by an embossing process, wherein advantageously the cover layer, before the joined crosslinking, is provided with a three-dimensional surface structure (grain) in an embossing process, in order not to complicate the embossing process.

In such an advantageous development of the method, a foam film laminate is foamed in which the foam has been produced uncrosslinked and the entire laminate is only crosslinked after the embossing or laminating process. The present foam material is produced by extrusion foaming, wherein a plastic composition is melted and mixed with desired additives in an extruder. The resultant flat material permits the generation of a three-dimensional surface structure (graining) by processes such as, for example, thermoforming, in-mold graining, low-pressure molding. Via a subsequent crosslinking of the foamed layer, the thermoform stability is achieved even in the range of low foam densities of <300 kg/m$^3$.

The plastic melt for the foam layer, in the method according to the invention, has in the die land (die), a shear viscosity of less than $10^7$ Pa·s, preferably $10^5$ to $10^7$ Pa·s, particularly preferably $10^5$ to $10^6$ Pa·s, at a melt temperature of below 230° C., typically 200-220° C., and a shear rate of less than $10^3$ s$^{-1}$.

The stretching viscosity of the plastic melt in the die land is less than $10^7$ Pa·s, preferably $10^5$ to $10^7$ Pa·s, particularly preferably $10^5$ to $10^6$ Pa·s, at a melt temperature of below 230° C. and a shear rate of 0.01 s$^{-1}$ to $10^2$ s$^{-1}$.

The melt strength of the extrudate is so pronounced that a force of more than 5 cN is achieved at a rate of elongation of 200 mm/s and a melt temperature of 200° C.

According to an advantageous development of the invention, the laminate is crosslinked in such a manner that, after the crosslinking, the joined layers, that is to say the laminate in total, have a gel content of 10-80%, preferably 15 to 65%, particularly preferably 15 to 40%, measured after 24 hours extraction in boiling xylene. A laminate having such a gel content has the required stability in further processing.

The laminate can be crosslinked with high-energy radiation, for example, electron-beam radiation, wherein sufficient crosslinking is a precondition for obtaining the grain in the further forming process. The method according to the invention leads to a very good grain stability on deep-drawing and to very good deep-drawing properties provided that the laminate is then crosslinked.

A further advantageous development of the invention is that the propellant or the inert gas, after sufficient melting and mixing of the plastic melt, is fed into the extruder, in particular in the immediate vicinity of the extruder exit die. The foamable melt is then extruded through a die at optimal pressure and temperature conditions.

Typical foam extrusion installations which can be used for producing physically foamed products are, for example, tandem extruders, double-screw extruders or an Optifoam® System (Sulzer) coupled to a double-screw extruder. The propellant or the inert gas can be added in different ways, for example, by direct injection in the extruder barrel, an Optifoam® System with a static mixer, injection into the extruder screw or injection in the discharge tool. The exit die can be constructed in different ways, for example, in the form of a slit die, an annular die, a multi-hole die or a slabstock slot die. For simultaneous extrusion of cover layer and foamed layer, coextrusion installations can also be used.

A further advantageous development of the invention is that, in the interior of the extruder upstream of the extrusion die, a pressure of at least 70 bar, preferably at least 100 bar, particularly preferably at least 120 bar prevails. Owing to the decrease in pressure from more than 70 bar upstream of the die to atmospheric pressure downstream of the die, the propellant-loaded polymer mixture expands in such a manner that a thoroughly uniformly foamed product is formed. Foam densities between 20 and 800 kg/m$^3$ with a foam thickness of 0.5 to 3.0 mm can be achieved by this foam production method.

As propellant, for example, $H_2O$ or inert gases, optionally in combination with one another, can be used.

The inert gases used in the method can be all inert gases known to those skilled in the art such as butane, pentane, helium or other noble gases. However, it is found to be particularly advantageous with respect to price, environmental acceptability and foam behavior when the inert gas is $CO_2$ or $N_2$. In this case the gas, as described above, is fed into the extruder as a physical propellant after sufficient melting and mixing of the components and mixed with the melt until a uniform distribution has formed.

For ready producibility of the multi-layer plastic film with good product properties, it has proved to be advantageous that, in the method, the cover layer and/or the layer made of foamed plastic is based on polyolefins, such as polyethylene or polypropylene.

Preferably, in the course of production of the multi-layer plastic film, the cover layer and the layer of foamed plastic are joined thermally or by adhesion to further polymer-based layers, for example, made of polyolefins, PVC, polyurethanes, polyamides, polyesters, polylactides, cellulose or lignin.

Likewise, the application of a coating applied to the decorated side for achieving surface properties such as scratch resistance is advantageous.

In order to achieve controlled foaming of the plastic melt by introducing suitable gases, generally certain rheological basic conditions must be met. The viscosity of the plastic melt must be high enough in order to generate a stable foamed system in which the foam cells have a uniform foam cell size distribution within a certain framework. In the event of too low a viscosity, no cells are formed in a controllable framework, because the gas that is introduced can escape from the melt. In addition, the foamed material must have sufficient stability in order, in a subsequent process step, to be able to be laminated to a further film layer, without the foamed material collapsing and being present again in compacted form. This requirement of the rheology can advantageously be achieved in that the layer of foamed plastic comprises at least one High Melt Strength polyolefin. HMS polyethylene and HMS polypropylene have a stretching viscosity of $10^4$ to $10^7$ Pa·s at 190° C., a Hencky Strain Rate of 0.1 s$^{-1}$ and a Hencky Strain of 3.0. HMS polyolefins of this type are available from various manufacturers on the market. They are highly branched and have the property of being more viscous at low shear rates than polymers of the same molecular weight but with a lower degree of branching in order to exhibit a greater fall in viscosity at high shear rates. A further path to a solution is the use of high-viscosity linear polymers to which are added what are termed foam stabilizers such as esters of fatty acids.

A plastic composition for the foam layer for carrying out the method can have the following composition:

20 to 80 parts by weight of a High Melt Strength polyethylene (HMS-PE),
20 to 80 parts by weight of at least one polypropylene,
0.05 to 1.0 parts by weight of at least one inert gas and
0.05 to 1.0 parts by weight of at least one nucleating agent,
wherein the parts by weight of the polymers total 100.

Further typical additives such as fillers, aging inhibitors and flame retardants can be present in the composition in typical amounts.

Polyethylenes in this case are taken to mean those polymers or copolymers which have a weight fraction of ethylene >50% by weight, and polypropylenes are taken to mean in this case those polymers or copolymers which have a weight fraction of polypropylene >50% by weight.

With this composition, foam layers can be obtained which have a foam density from 200 to 600 kg/m$^3$ and may be deep-drawn without collapse of the cells. In this manner, multi-layer plastic films of low weight can be obtained. The fraction of 20 to 80 parts by weight of at least one high melt strength polyethylene ensures, in the product obtained, sufficient cold flexibility with good softness and favorable product price, whereas the fraction of 20 to 80 parts by weight of at least one polypropylene ensures good heat stability.

As propellants or inert gases, the abovementioned substances can be used, wherein $CO_2$ or $N_2$ produce the best cell structure. The gases are fed into the composition in liquid form at elevated pressure.

As nucleation agents (nucleating agents in polymers), not only chemically active nucleation agents (for example, $NaHCO_3$) but also physically active nucleation agents (for example, talcum, silicon oxide or titanium, dioxide) can be used. The nucleation agents are important for optimum cell structure.

According to an advantageous further development of the invention, the high melt strength polyethylene has a melt flow index MFI (190° C., 2.16 kg as specified in ISO 1133) from 0.05 to 2.0 g/10, preferably from 0.1 to 1.0 g/10 min. This ensures good extrusion behavior.

It has proved to be advantageous that the polypropylene or polypropylenes in the plastic composition likewise has or have a high melt strength (HMS-PP). This likewise contributes to good extrusion behavior for forming and obtaining optimum foam structure.

The polypropylenes used preferably have a melt flow index MFI (230° C., 2.16 kg as specified in ISO 1133) from 0.05 to 8.0 g/10 min, preferably 1 to 5 g/10 min.

The multi-layer plastic film produced as claimed in the method according to the invention can be used in various sectors. For instance, it is suitable as internal lining of a commercial motor vehicle and also permits components to be produced in the airbag sector which advantageously succeed without weakening or scores for tearing open the laminate when the airbag is opened. In the case of the multi-layer plastic film, there is also the possibility that foamed and compact plastic layers can be arranged next to one another under a cover layer, in such a manner that adaptation with respect to the haptic properties can proceed in different regions of the laminate.

DESCRIPTION OF THE PREFERRED EMBODIMENTS OF THE INVENTION

The invention will be described in more detail with reference to comparative examples and exemplary embodiments which are shown in Table 1.

TABLE 1

| Components | Comparative example Formula for a compact film | Example 1 according to the invention Formula for method according to the invention | Example 2 according to the invention Formula for method according to the invention |
|---|---|---|---|
| PE[a] | 60 | 60 | 60 |
| PP[b] | 40 | 40 | 40 |
| Inert gas/propellant[c] | — | 0.30 | 0.15 |
| Nucleation agent[d] | — | 0.1 | 0.3 |
| Antioxidant[e] | 0.3 | 0.3 | 0.3 |
| Pigments | 1 | 1 | 1 |
| Density at a thickness of 1.00 mm | 900 kg/m$^3$ | 500 kg/m$^3$ | 500 kg/m$^3$ |
| Extension at highest tensile force at 120° C. (ISO 527-3) | | | |
| longitudinal | 395% | 425% | 435% |
| transverse | 477% | 500% | 550% |

[a]ethylene-butene-copolymer, MFI = <0.5 g/10 min at 190° C.; 2.16 kg, stretching viscosity of 300 kPa · s at 190° C. at Hencky Strain Rate of 0.1 s$^{-1}$ and Hencky Strain of 3.0
[b]homopolypropylene, MFI = 2.5 g/10 min at 230° C.; 2.16 kg, stretching viscosity of 10$^6$ Pa · s at 190° C. at Hencky Strain Rate of 0.1 s$^{-1}$ and Hencky Strain of 3.0
[c]liquid carbon dioxide
[d]Hydrocerol ® NUC 5530 (sodium hydrogen carbonate with citric acid as masterbatch), Clariant, Germany
[e]sterically hindered phenol In Table 1, mixture formulas are given for a compact film and for foam layers foamable by the method according to the invention, wherein the amounts are given in parts by weight. The fractions of the polymers total 100 in this case.

In addition, Table 1, in the lowest lines, shows the densities of the films generated by the compositions. It becomes clear here that the foamed films have a markedly lower weight. The films produced by the methods according to the invention, despite lower density values, have sufficient stability at degrees of elongation of greater than 300% on deep-drawing. For stretching at maximum tensile force, markedly higher values are achieved for the material according to the invention, which has beneficial effects on the deep-drawing behavior.

By means of the foamed film laminate produced by the method according to the invention, a structure is made available which has lower production costs, exhibits good deep-drawing properties, spares weight and consumes less energy and raw materials owing to the less complex production process. On account of the lower weight, in addition, when using the laminate in an automobile interior, less energy is required for moving the vehicle.

It is understood that the foregoing description is that of the preferred embodiments of the invention and that various changes and modifications may be made thereto without departing from the spirit and scope of the invention as defined in the appended claims.

What is claimed is:

1. A multi-layer plastic film comprising:
   a foam layer; and at least one compact cover layer adjacent to the foam layer;
the foam layer obtained from a foamable plastic composition including:
20 to 80 parts by weight of a high melt strength polyethylene (HMS-PE);
20 to 80 parts by weight of at least one polypropylene;
0.05 to 1.0 parts by weight of at least one inert gas; and
0.05 to 1.0 parts by weight of at least one nucleating agent,
wherein the combined weight of the HMS-PE and the at least one polypropylene is 100 parts by weight, and wherein the foam layer is at first not crosslinked and is crosslinked together with the compact cover layer only after the foam layer and the compact cover layer have been joined.

2. The multi-layer plastic film as claimed in claim 1, wherein the HMS-PE has a melt flow index (MFI) (190° C., 2.16 kg as specified in ISO 1133) from 0.05 to 2.0 g/10 min.

3. The multi-layer plastic film as claimed in claim 1, wherein the at least one polypropylene is a high melt strength polypropylene (HMS-PP).

4. The multi-layer plastic film as claimed in claim 1, wherein the at least one polypropylene have has a melt flow index (MFI) (230° C., 2.16 kg as specified in ISO 1133) from 0.05 to 8.0 g/10 min.

\* \* \* \* \*